E. J. NOBLE.
PROCESS AND APPARATUS FOR MAKING SHELL CASINGS.
APPLICATION FILED MAR. 26, 1917.

1,286,726.

Patented Dec. 3, 1918.
6 SHEETS—SHEET 1.

Attest:

Inventor:
Edward J. Noble
Clarence G. Campbell
his Atty.

UNITED STATES PATENT OFFICE.

EDWARD J. NOBLE, OF HARTFORD, CONNECTICUT.

PROCESS AND APPARATUS FOR MAKING SHELL-CASINGS.

1,286,726. Specification of Letters Patent. Patented Dec. 3, 1918.

Application filed March 26, 1917. Serial No. 157,320.

*To all whom it may concern:*

Be it known that I, EDWARD J. NOBLE, a citizen of the United States, residing at Hartford, in the county of Hartford and State of Connecticut, have invented certain new and useful Improvements in Processes and Apparatus for Making Shell-Casings, of which the following is a specification.

This invention relates to a process for making shell casings or similar articles, and its novelty consists in the successive steps of the process by which the desired result is accomplished and the construction and adaptation of the parts of a preferred form of apparatus by the use of which the process is readily performed.

At the present time, shells or rather shell casings are usually made of cast metal and in ultimate form are hollow cylinders open at one end. After being so cast they are subjected to various machine operations to secure uniformity of the dimensions in the several shells. By means of the described invention, the shell casings are stamped out of suitable pieces of metal and are thus made more uniform in size requiring fewer subsequent operations, they may be made of metal having more desirable physical properties, and may be made rapidly without the aid of skilled labor and in great quantities.

In general the process consists in first heating the billets of metal (hereinafter called the work-pieces) in an oven to a suitable temperature approximately 2000 degrees F. whereby they are brought to a plastic condition to render easy the stamping or forming operation.

There are a number of molds mounted in a revolving carrier. After the heated work piece drops into its mold, the latter is moved to position beneath a press and simultaneously one of a series of dies, or formers, is brought to position above the work piece in the mold, and, the press being then actuated, the die is moved downwardly against the work piece and forms it into the desired shape. During this operation the die is rigidly held against displacement. After the pressing operation has taken place, the die is automatically raised and the work piece held against such movement. The mold still carrying the work piece is then moved away from the press and, reaching a convenient place of discharge, the bottom of the mold is opened and the finished shell is allowed to fall out. It will be understood that while the operations upon any particular work piece are successive, they are simultaneous with respect to different work pieces; that is, while one work piece is being fed into a mold, another is being pressed into shape and a third is being ejected from a mold. All of the operations are appropriately timed and automatically performed in rapid succession whereby there is no unnecessary loss of heat or time and the work is performed with a minimum of loss of either heat or mechanical energy.

In the drawings, 20 designates a suitable oven or heating apparatus having an inclined bottom 21; and an exit port 23 is provided through one of its side walls. A slide-way or chute 24 leads from the exit port to a point over the path of travel of one of the molds.

In convenient proximity to the heating apparatus is the revolving mold carrier and its actuating mechanism. A bed plate 26 is secured to or made integral with the floor. Secured to this by any suitable means, as bolts 27, is a hollow pedestal 28 and supported in ball bearings 29 and adapted to revolve around the pedestal is a turret 30 having three faces each alike and each provided with radial arms 31, to the ends of which are adjustably secured by means of wedges 32 and screwbolts 34ª, the shanks 34 of molds 35 each mold having a central aperture of suitable shape and a hinged bottom 36. The wedges 32 are operated by means of screws 33. The arms are adjustable, so that the paths of the molds may be made exactly coincident to properly coöperate with the instrumentalities hereinafter described. The pedestal is further secured in place by an upright member 37 secured in turn to a wing or bracket 38 extending from the frame of the pressing device, presently to be described.

Means are provided for revolving the mold carrier intermittently consisting of a crown gear 40 secured to the turret 30 and adapted to be engaged by a bevel gear 41 mounted on and revolving with a shaft 42 actuated through a train of gearing from a pulley 43 rotated from a suitable source of power, not shown. The gears are so proportioned that one revolution of the crown gear rotates the turret and carrier through a third revolution, the bevel gear being thrown in and out of mesh by a clutch generally indicated at 44.

Arranged substantially one-third of the way around the apparatus from the heating device is a die carrier and press. The die carrier comprises an arbor or frame 47 having four radial arms 48, each carrying a die or former 49 which may be removably secured thereto. It is slidably mounted on a sleeve 50 rotatably mounted upon an upright rod 51. The arbor 47 is held up by means of a spring 52 coiled around the sleeve. The rod 51 is supported by a socket plate in the press bed plate 62 and a part 53 of the upper frame of the apparatus. The sleeve 50 is moved by a pair of gears 54 and 55, the latter mounted on a shaft 57 receiving its motion from the pulley 43 through a train of gearing. A clutch 56 throws the gears in and out of mesh as may be required, each time rotating the arbor through a quarter of a revolution whereby in turn each die is brought to proper position above a mold as the mold carrier is intermittently rotated.

Figure 5:
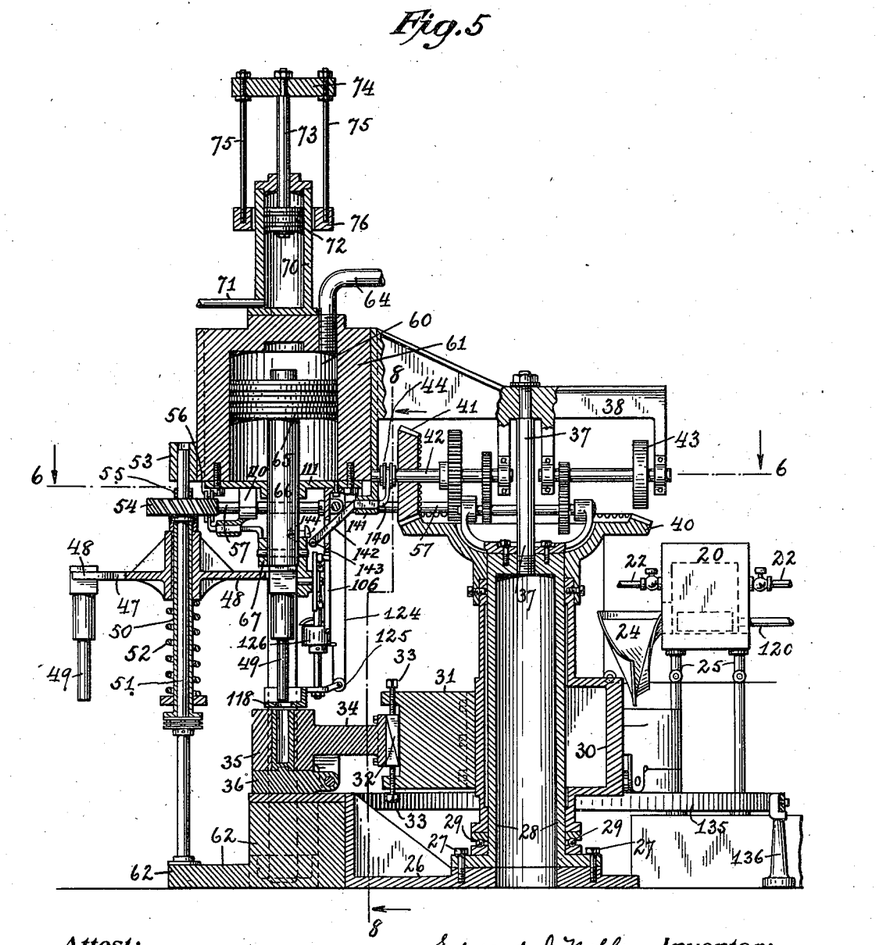
Fig. 5 is an enlarged vertical section of the apparatus shown in Figs. 1 and 2.
Figures 6, 7:
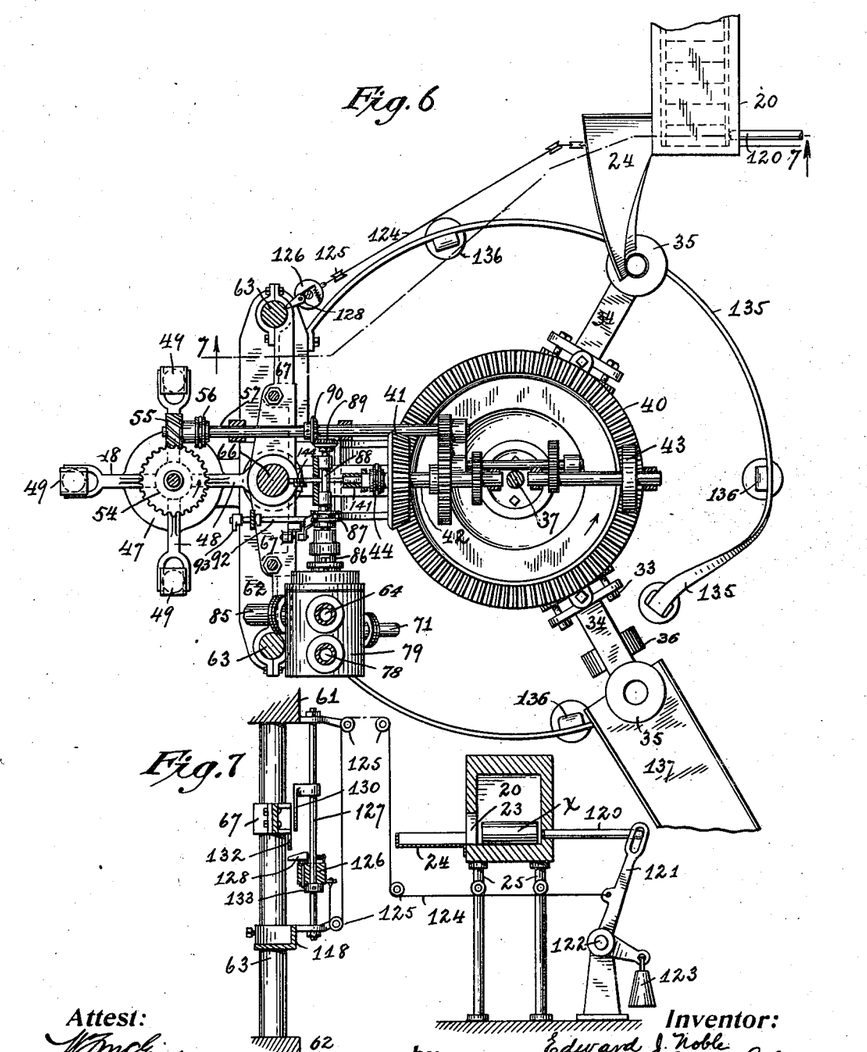
Fig. 6 is a plan view of the parts shown in Fig. 5 beneath the plane of the line 6—6 in Fig. 5.
Fig. 7 is a vertical section on the plane of the broken line 7—7 in Fig. 6 illustrating the mechanism for ejecting the work pieces from the heating apparatus.
Figure 8:
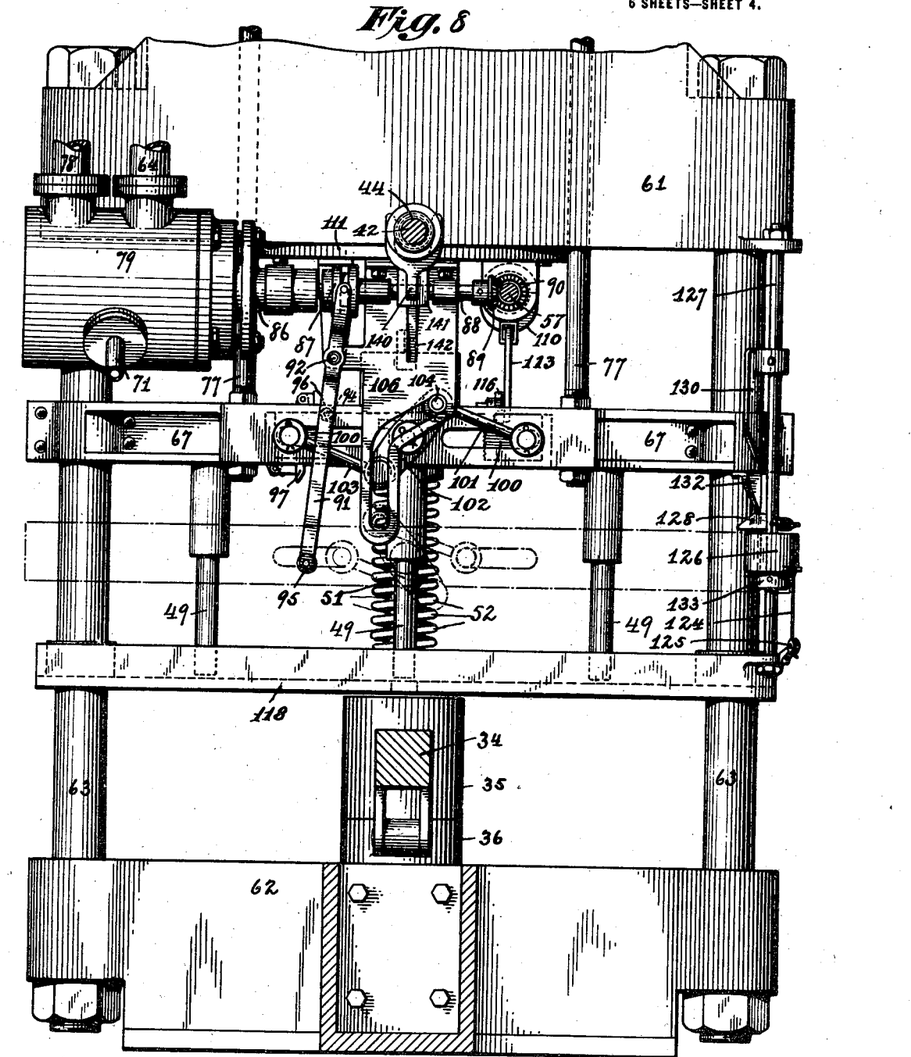
Fig. 8 is a yet further enlarged vertical section on the plane of the line 8—8 in Fig. 5 and an elevation of the parts back of the section plane.
Figure 9:
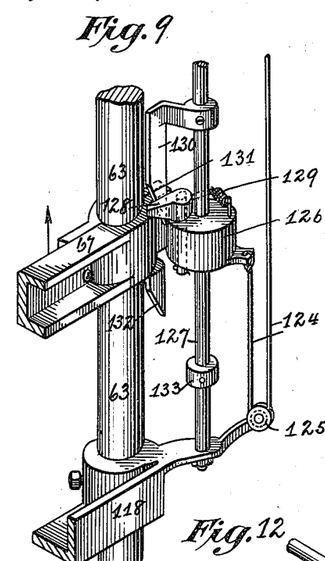
Figs. 9 and 10 are perspective details of the device whereby the mechanism shown in Fig. 7 is tripped.
Figure 10:
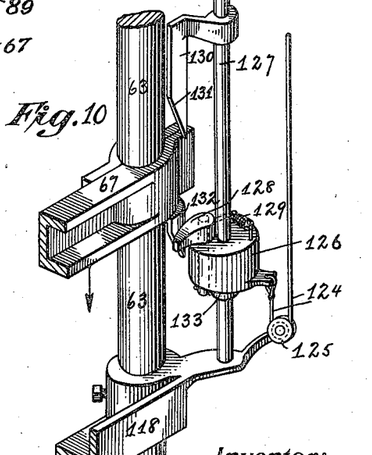
Figure 11:
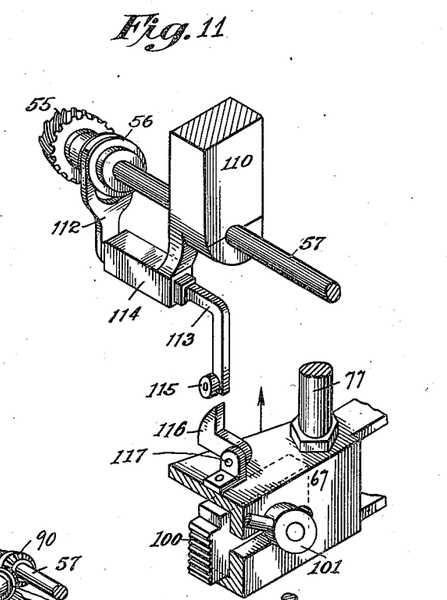
Fig. 11 is a perspective detail of the clutch of the die carrier actuating mechanism.
Figure 12:
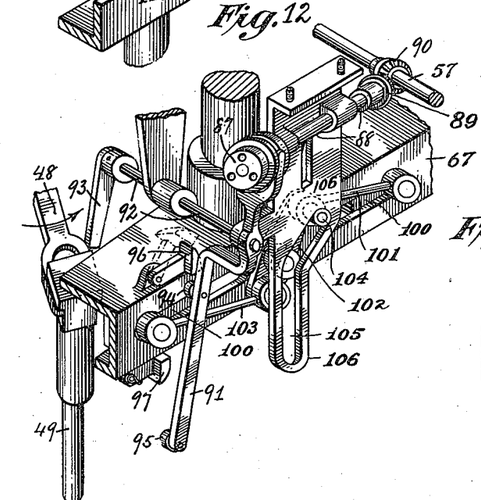
Fig. 12 is a detail of the pressure valve clutch and adjacent parts.
Figure 13:
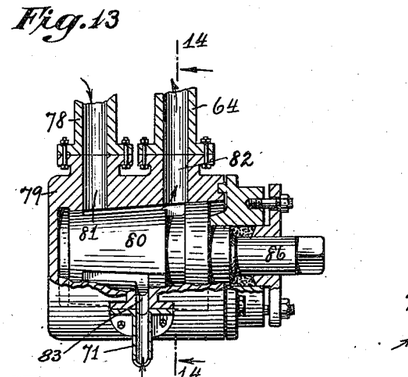
Fig. 13 is a sectional detail of the press valve mechanism.
Figure 14:
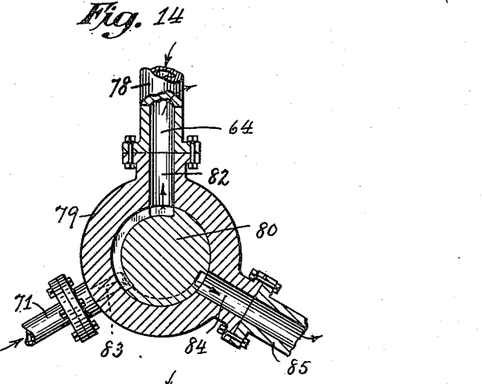
Fig. 14 is a section on the plane of the line 14—14 in Fig. 13.
Figure 15:
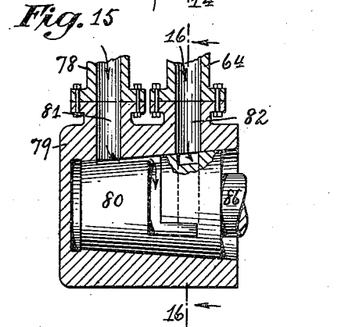
Figs. 15 to 18 are views similar to Figs. 13 and 14 showing other positions of the valve parts.
Figure 16:
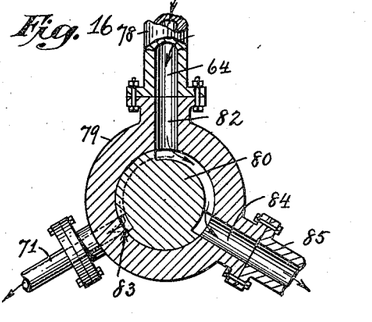
Figure 17:
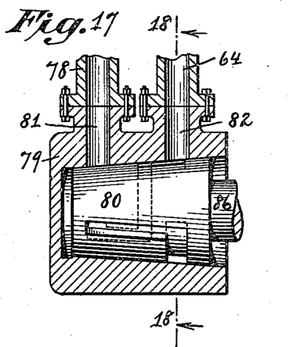
Figure 18:
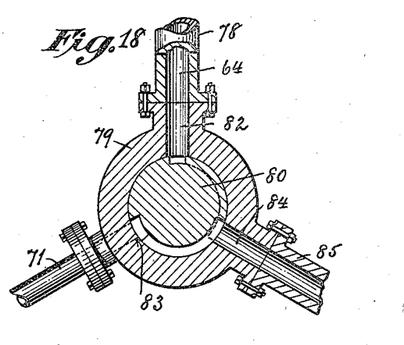

The press comprises a high pressure cylinder 60 formed in a member 61 arranged transversely of the apparatus and supported from a bed plate 62 by means of two standards 63, 63 the whole constituting an upright frame. A single pipe 64 serves as a pressure and exhaust pipe for the cylinder. Within the cylinder is a piston 65 having a depending rod 66 which is secured to a cross head 67 mounted to slide on the standards 63, 63. Above the cylinder 70 there is arranged a smaller low pressure cylinder 70 having a pressure and exhaust pipe 71, a piston 72 with an upwardly extending rod 73 secured in turn to a frame consisting of a transverse member 74, depending members 75, 75 and a cross head 76 which in turn is connected to the cross head 67 by rods 77, 77. A pipe 78 connected to a suitable source of fluid under pressure leads to a casing 79 containing a rotary valve 80 and four ports, viz., one 81 leading from the supply pipe 78, a second 82 leading to the pressure and exhaust pipe 64 of the large cylinder, a third 83 leading to the pressure and exhaust pipe 71 of the small cylinder, and a fourth 84 leading to an exhaust 85 for both cylinders. The valve 80 is provided with channels or recesses in its outer surface registering with the different ports and is oscillated by means of a stem indicated at 86, which is extended outwardly and terminates in a one-third pin clutch 87, which in turn is connected to a shaft 88 provided with a terminal bevel gear 89 adapted to mesh with and receive power from a bevel gear 90 secured on the shaft 57. Whenever the clutch is thrown in the valve stem 86 is rotated one-third of a revolution. The clutch is operated by means of a lever 91 (see Figs. 8 and 12) supported on a rock shaft 92 adapted to oscillate in bearings in the frame of the machine and having a trip 93 projecting into the path of one of the arms 48 of the die carrier. On the side of the lever 91 are two rollers 94 and 95 adapted to contact with two cams 96 and 97 both hingedly mounted on the cross head 67. When the press is actuated and the cross head 67 is moved downward, it moves with it the particular die which happens to be beneath it. As the dies are mounted on a relatively light frame, the strain brought to bear on it is in part relieved by providing a supplemental means for supporting the die during the pressing operation. This includes a pair of jaws 100, 100 slidably mounted on the cross head 67 and adapted to clamp the shank of each die as it is moved downwardly. These jaws are operated by means of links 101, 102 and 103 hingedly connected to the respective jaws, the link 101 being provided with a roller 104 adapted to engage a slot 105 in a cam plate 106 secured to the member 61 (see Figs. 5 and 8).

A bracket 110 is secured to the under side of the high pressure cylinder plate 111 and serves to support the shaft 57 and carries the members of the clutch 56. The latter is operated by a lever 112 having a shank 113 adapted to slide in a sub-bracket 114 depending from the bracket 110. At the end of the shank 113 which is bent downwardly is a roller 115 adapted to engage the surface of a cam 116 secured by a pivot 117 to the cross head 67. A bar 118 secured to the standards 63 is so placed that when a die is withdrawn from a mold after the pressing operation if the work piece adheres to the die and attempts to follow it is prevented by contact with this bar which serves as a detent.

Means are provided for removing each work piece from the heating apparatus as follows: The work pieces x roll by gravity down the bottom 21 until they each arrive opposite the exit port 23. They are then in succession quickly pushed through this port onto the slideway 24 by means of a pusher 120 which is supported at its front end in an aperture in one of the walls 20 and at the other end is engaged by the slotted end of a lever 121 adapted to swing on a pivot 122 mounted on a suitable support and retracted to position after movement by a counter weight 123. Secured to the lever is a cord 124 passing over a system of pulleys 125 suitably arranged at convenient places on the apparatus and secured at its other end to a slider 126 mounted to move up and down on a rod 127 arranged between the member 61 and detent bar 118. On this slider is pivoted a catch 128 held in an outward position by a spring 129. On the rod 127 is secured a release cam 130 having a beveled edge 131 adapted to contact with the catch 128 and secured to the cross head 67 is a latch plate 132 adapted to swing the catch to one side and allow the cross head to pass downward. A stop collar 133 also secured to the rod 127 serves to limit the downward movement of the slider. By this means when the cross head 67 is raised, its upper edge passes under the catch 132 and raises the slider 126 and pulls the cord to move the lever 121 and pusher 120 so that the latter forces a work piece x out of the oven through the aperture 23 on to the chute 24. As the cross head 67 continues to move upward the cam edge 131 of the plate 130 contacts with the catch 128 and moves it off of the cross head and causes the slider to drop suddenly to the stop collar 133, this movement being assisted by the pull of the counterweight 123, thus resetting the pusher for a new operation. The latch 132 contacts with the catch 128 during the downward movement of the cross head so as to push it away therefrom until the upper edge of the cross head has passed beneath the catch.

Means are provided to keep the work piece in the mold carrier consisting of a flat rail 135 suitably mounted on supports 136 and covering nearly the entire circumference of its travel. The hinged bottom of the mold rests on this rail except at the point where the pressing operation takes place, when it rests on the base 62, and except also when it passes over a discharge chute 137. The rail is interrupted at this latter point, the hinged bottom is allowed to drop, and the work piece falls on the chute by gravity.

The clutch 44 for controlling the operation of the mold carrier driving gear is operated by means of a lever 140, adapted to slide in a bracket 141 secured to the wing 38, and which lever is provided with a tail 142 having a terminal roller 143, the tail passing through an aperture in the plate 106 and the roller coöperating with a cam 144 secured by a pivot to the piston rod 66.

Figure 1:
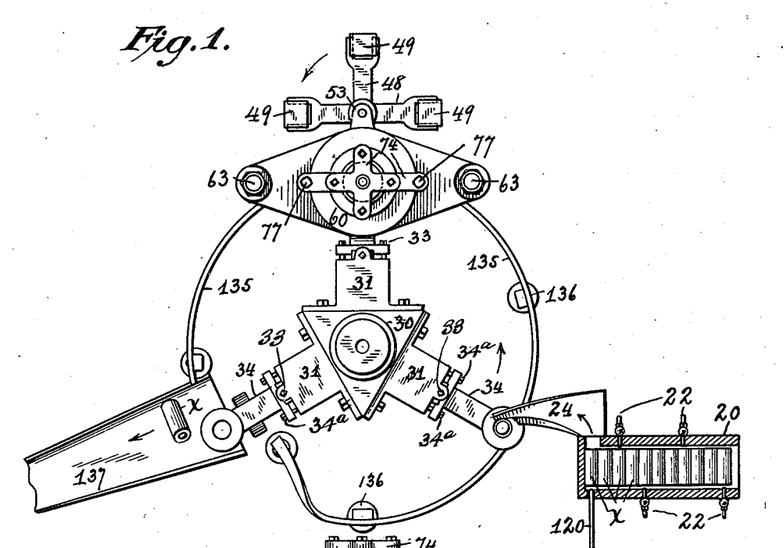
Figure 1 is a top plan view of the preferred form of apparatus with the driving mechanism omitted.
Figures 2, 3, 4:
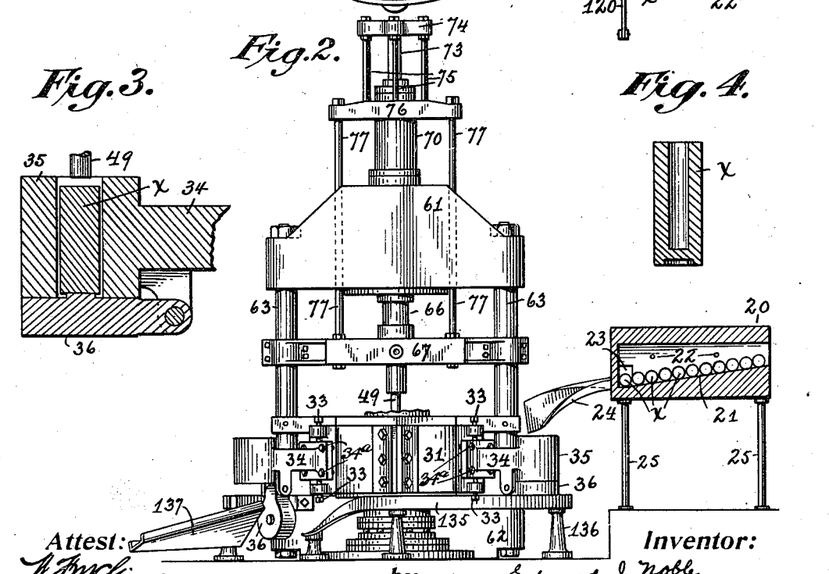
Fig. 2 is a front elevation of the same, partly in section.
Fig. 3 is a central vertical section of a mold showing a work piece in position ready to be operated upon.
Fig. 4 is a central vertical section of the work piece after it has been formed.

It is thought that the operation of the device will have been understood from the foregoing description, but the succession of operations or steps whereby the shell casing is produced may be summarized as follows:—The work pieces x, x, x are heated to a suitable temperature in the heating apparatus by means of the gas burners 22, 22. It is desirable that the heating operation should be continued until the entire mass of metal in each work piece has arrived at substantially the same high uniform temperature. It will be understood that the work pieces are successively ejected or pushed from the heating apparatus through the exit aperture 23 provided for that purpose and allowed to fall upon the chute or guideway 24 the configuration of which is such that each work piece in succession is caused to slide into the mold 35 which has been brought by the carrier to a proper position for that purpose. Now, assuming that the parts are in the positions shown in Fig. 1 and that a work piece has been delivered to the nearest mold carrier and that another work piece has just been brought to rest in its mold beneath the die or plunger in the pressing apparatus, the movement of the cross head 67 is such that the various clutches operated by such movement have been moved, the piston 66 and the cross head 67 are depressed, the work piece in the mold immediately beneath the die is formed into shape, and the other operations take place successively or simultaneously as the case may be, and as the various clutches are set, it being understood that the continued rotation of the valve stem 86 first causes fluid under pressure to be introduced into the large cylinder to move down the piston 66 and cross head 67 to cause the dies carried by the die carrier to be brought into position and move forward the jaws 100, 100 by which they are firmly held, and that such further movement of the valve stem 86 causes the large cylinder to exhaust and the fluid to be introduced into a small cylinder to lift the cross head back to place, while in the meantime the operation of the proper clutch 44 has moved the mold carrier to position and has swung around that particular mold in which the work piece was formerly formed to a position where the bottom of the mold 36 no longer is upheld by contact with the rail 135 and the work piece $x$ drops out upon the discharge chute 137.

It will of course be understood that the several clutches and cams, latches, catches and other coöperating parts must be timed to act together in proper succession and at proper intervals in order that the desired results may be accomplished, but these are matters of adjustment which the mechanician can take care of without any particular difficulty.

It will be understood that modifications may be made in the details of construction of the apparatus within the scope of the appended claims, without departing from its essential principles.

I claim:—

1. An apparatus for making shell casings and the like, comprising means for raising the temperature of the work piece to a suitable degree to render it plastic, means for transferring the work piece to a mold without appreciable loss of heat, means for moving the filled mold to position in front of a die, means for moving the die against the work piece in the mold, and means for removing the mold and its contents away from the die and discharging the work piece from the mold.

2. An apparatus for making shell casings and the like, comprising means for raising the temperature of the work piece to a suitable degree to render it plastic, means for transferring the work piece to a mold without appreciable loss of heat, means for moving the filled mold to position in front of a die, means for moving the die against the work piece in the mold, means for removing the mold and its contents away from the die and discharging the work piece from the mold, and means for moving the mold to position to receive a new heated work piece to repeat the cycle of operations.

3. In an apparatus of the character described, including a pusher for moving a work piece, and a press or the like by means of which the work piece is thereafter acted upon, a cross head on the press and means for actuating the pusher from the cross head comprising a lever, a connection between it and the pusher, a cable secured to the lever and moved in one direction thereby, and a counter weight on the lever tending to move it in the opposite direction.

4. In an apparatus of the character described, including a pusher for moving a work piece, and a press or the like by means of which the work piece is thereafter acted upon, a member, moving with the press and means for actuating the pusher from the movement of such member including an operation lever for the pusher, a counterweight thereon, a cable secured thereto, a slider adapted to be moved from the cross head and a device for bringing it into and out of engagement with the cross head as the latter moves in one direction or the other.

5. In an apparatus of the character described, including a pusher for moving a work piece, and a press or the like by means of which the work piece is thereafter acted upon, a member, moving with the press and means for actuating the pusher from the movement of such member including an operating lever for the pusher, a cable secured thereto, a slider adapted to be moved from the cross head and a device for bringing it into and out of engagement with the cross head as the latter moves in one direction or the other and including a spring held catch interposed in the path of the moving member as it moves in one direction and a latch for holding it out of such path as it moves in the opposite direction.

6. In an apparatus of the character described, the combination with a moving cross head, of a work piece pusher and intermediate mechanism for moving the latter from the former, including a slider, a rod on which it is adapted to move, a cable between it and the pusher, a catch on the slider, a spring moving it toward the cross head and two devices for preventing such movement one on the cross head and one away therefrom but in proximity thereto.

7. In an apparatus of the character described, a mold carrier, a series of molds carried thereby, means for moving the carrier, means for supplying a work piece to each mold at a point in its path of travel, and means for preventing the discharge of a work piece from its mold during a portion of the travel and permitting such discharge at another portion in its travel, including a bottom for each mold, a hinge by which the bottom is secured to the mold but not held in place against the same, and a supporting rail arranged beneath the carrier and in a line coincident with the path of travel of each mold and by contact with which rail each mold bottom is held in a closed position, the continuity of the rail being interrupted at the point of discharge of the work piece from the mold.

8. In an apparatus of the character described, a mold carrier, a series of molds carried thereby, each mold comprising a cylindrical body open at the top and provided with a bottom secured to the body by a hinge whereby when not upheld by external means the bottom is allowed to hang on the hinge clear of the body.

9. In an apparatus of the character described, a mold carrier, a series of molds carried thereby, each mold comprising a cylindrical body open at the top and provided with a bottom secured to the body by a hinge whereby when not upheld by external means the bottom is allowed to hang on the hinge clear of the body, means for moving the carrier, and external means for holding the bottom of each mold closed during a portion of such movement, including a supporting rail arranged along a portion of the path of travel of the molds and in close contact with the under surface of each mold.

10. In an apparatus of the character described, a mold carrier, a series of molds carried thereby, means for intermittently moving the carrier, and means for supplying a work piece to each mold during the intermission of such movement, including a receptacle adapted to hold a series of such work pieces, a pusher and intermittent means for moving the pusher to transfer a work piece to a mold each time the carrier stops.

11. In an apparatus of the character described, a mold carrier, a series of molds carried thereby, means for intermittently moving the carrier, means for supplying a work piece to each mold at a predetermined point during the intermission of such movement and means for discharging a work piece at another point from another mold during the same intermission, and further means for retaining each work piece in its mold until the desired point of discharge is reached.

12. In an apparatus of the character described, a mold carrier, a series of molds carried thereby, means for intermittently moving the carrier, and means for supplying a work piece to each mold during the intermission of such movement and discharging a work piece from another mold during the same intermission, and further means for retaining each work piece in its mold until the desired point of discharge is reached, including a removable bottom for each mold and a detaining rail over which and in contact with which such bottom is adapted to travel between the points of supply and discharge.

13. In an apparatus of the character described, a mold carrier, a series of molds carried thereby, means for intermittently moving the carrier and means for supplying a work piece to each mold during the intermission of such movement, including a receptacle adapted to hold a series of such work pieces, a pusher and intermittent means for moving the pusher to transfer a work piece to a mold each time the carrier stops, and means for discharging a work piece from another mold whenever the carrier stops.

14. In an apparatus of the character described, a mold carrier, a series of molds carried thereby, means for intermittently moving the carrier and means for supplying a work piece to each mold during the intermission of such movement, including a receptacle adapted to hold a series of such work pieces, a pusher and intermittent means for moving the pusher to transfer a work piece to a mold each time the carrier stops, and means for discharging a work piece from another mold whenever the carrier stops, and further means for retaining each work piece in its mold until the desired point of discharge is reached.

15. In an apparatus of the character described, a power driven shaft, a mold carrier, power transmitting mechanism between the shaft and the carrier, a die press, means for actuating it, a clutch governing the operation of the mold carrier mechanism and means moved from the actuation of the press to control such clutch.

16. In an apparatus of the character described, a power driven shaft, a mold carrier, power transmitting mechanism between the shaft and the carrier, a die press, a die carried thereby, a cross head adapted to move the die against work pieces in the molds of the carrier when the latter are in position, means for moving the cross head, and supplemental means for holding the die rigid during the movement of the cross head and further means for preventing a work piece from leaving its mold while the die is executing its retrograde movement.

17. In an apparatus of the character described, a power driven shaft, a mold carrier, power transmitting mechanism between the shaft and the carrier, a die press, a die carried thereby, a cross head adapted to move the die against work pieces in the molds of the carrier when the latter are in position, means for moving the cross head and supplemental means for holding the die rigid during the movement of the cross head including jaws on the cross head, levers for moving the same and a cam on the apparatus guiding such movement.

18. A mold carrier comprising a central sleeve, arms radially arranged thereon, molds mounted one at the end of each arm and consisting of a cylindrical body open at the top and having a removable bottom and means for varying the effective length of each arm.

19. A mold carrier comprising a central sleeve, arms radially arranged thereon, molds mounted one at the end of each arm and consisting of a cylindrical body open at the top and having a removable bottom and means for varying the effective length of each arm, consisting of a pair of coöperating wedges adapted to be moved in a direction at right angles to the center line of each arm.

20. A mold carrier comprising a central sleeve, arms radially arranged thereon, molds mounted one at the end of each arm and consisting of a cylindrical body open at the top and having a removable bottom and means for varying the effective length of each arm, consisting of a pair of coöperating wedges and means for moving them in a direction at right angles to the center line of each arm including a screw secured to or made integral with each wedge and a coöperating member through which it is threaded.

21. In an apparatus of the character described, a die press comprising a bed plate, a cross head and means for reciprocating it, a die carrier comprising a plurality of arms each carrying a die at its extremity and means for intermittently moving the die carrier to bring each die in succession to a position above the bed plate and beneath the cross head, and means for moving each die away from the bed plate after it has been moved toward the same by the cross head.

22. In an apparatus of the character described, a die press comprising a bed plate, a cross head and means for reciprocating it, a die carrier comprising a plurality of arms each carrying a die at its extremity and means for intermittently moving the die carrier to bring each die in succession to a position above the bed plate and beneath the cross head, a mold carrier comprising a plurality of arms each carrying a mold at its extremity and means for intermittently moving the mold carrier to bring each mold in succession to a position above the bed plate and beneath the die and cross head.

23. In an apparatus of the character described, a die press comprising a bed plate, a cross head and means for reciprocating it, a die adapted to be moved by the cross head toward the bed plate and means for bringing the die to position beneath the cross head and means for clamping the die to the cross head during its downward movement and releasing it therefrom during its upward movement.

24. The combination with a press having a reciprocating plunger, of a die carrier provided with a plurality of dies, a support on which the carrier is adapted to be reciprocated, and means for intermittently actuating the carrier to bring each die in succession beneath the plunger.

25. The combination with a press having a reciprocating plunger, of a die carrier provided with a plurality of dies, a support on which the carrier is adapted to be reciprocated, and means for intermittently actuating the carrier to bring each die in succession beneath the plunger, including a continually rotating shaft, an intermediate train of gearing between it and the die carrier and a clutch operated by the movement of the press plunger to throw the carrier in and out of engagement with the shaft through such train of gearing.

26. In combination, a fluid pressure press, a large cylinder, a plunger operated therefrom to be moved in one direction, a small cylinder, means actuated therefrom to move the plunger in the opposite direction, a single valve controlling the operation of both cylinders, a die carrier, a continually running shaft and two clutches one between the shaft and the press control valve and the other between the shaft and the die carrier, and a common means for moving both clutches.

27. The process of making shell casings and the like which consists, first, in raising a plurality of work pieces to a temperature at which they become plastic, second transferring them successively while so heated quickly to different molds, third, retaining them in the molds and moving the same successively to an operative position in front of die mechanism, fourth, moving the die mechanism to press against the work pieces in the molds to shape them within the molds, and fifth, discharging the work pieces from the molds, the various operations on different work pieces being carried on simultaneously.

28. The process of making shell casings and the like which consists first in raising the work pieces to a temperature at which they become plastic, second transferring them successively while so heated quickly to molds, third, retaining them in the molds and moving the same successively to an operative position in front of die mechanism, fourth moving the die mechanism to press against the work pieces in the molds to shape them within the molds, fifth withdrawing the die mechanism, and simultaneously detaining the work pieces in the molds, and sixth, discharging the work pieces from the molds, the various operations on different work pieces being carried on simultaneously.

29. The process of making shell casings and the like which consists first in raising a plurality of work pieces to a suitable temperature at which they become plastic, second, transferring them successively while so heated quickly to molds, third, retaining them in the molds and moving the same to an operative position in front of die mechanism, fourth relatively moving the die mechanism and molds whereby the die mechanism shape the work pieces within their respective molds, and fifth discharging the finished work pieces from the molds, the different operations on the work pieces being carried on simultaneously.

In testimony whereof I affix my signature in presence of two witnesses.

EDWARD J. NOBLE.

Witnesses:
R. D. CHAPIN,
W. H. ROWLEY.